Oct. 23, 1945.    F. FENTON    2,387,433
VALVE FOR HOLLOW INFLATABLE ARTICLES
Filed Oct. 16, 1944
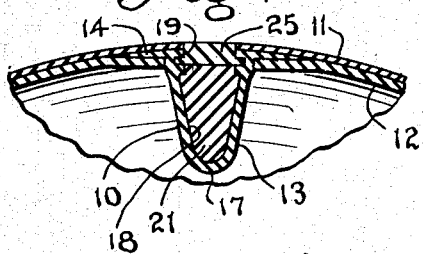
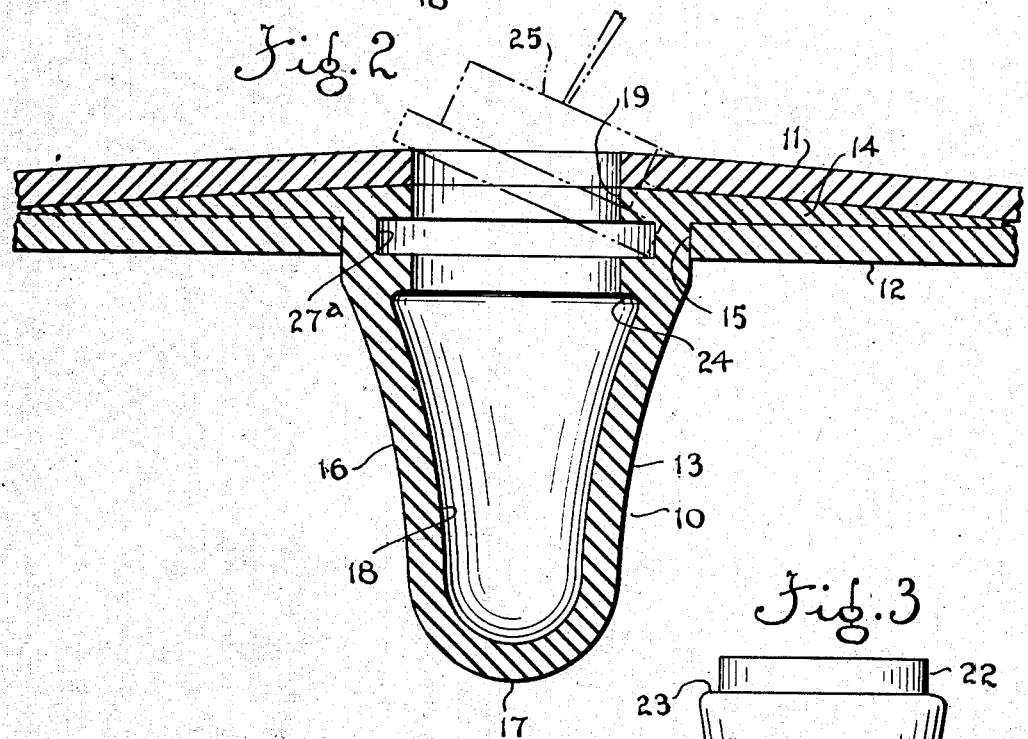
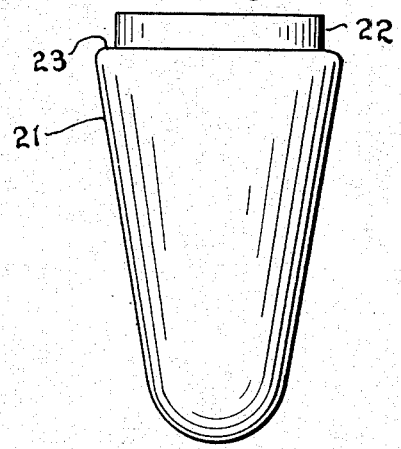
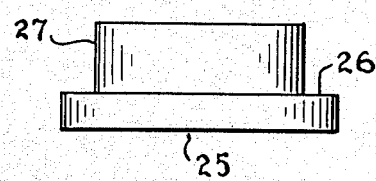
INVENTOR.
Frank Fenton
BY William Cleland
Attorney Patented Oct. 23, 1945

2,387,433

UNITED STATES PATENT OFFICE 2,387,433

VALVE FOR HOLLOW INFLATABLE ARTICLES

Frank Fenton, Akron, Ohio, assignor to The Sun Rubber Company, Barberton, Ohio, a corporation of Ohio Application October 16, 1944, Serial No. 558,821

5 Claims. (Cl. 273—65)

This invention relates to valves for hollow inflatable articles, such as footballs.

Heretofore, inflatable articles such as footballs or the like have been provided with various types of self-sealing valves. One type of valve which in the past has received somewhat greater acceptance by the trade than others has usually comprised a hollow valve stem filled with a core of material having the quality of being self-sealing or self-healing upon puncturing the valve with a needle-type inflating device. Attempts have been made at various times to provide a valve design which would permit ready removal and replacement of the self-sealing core, but such attmpts have not been entirely satisfactory due to the fact that special tools or valve parts were required for the replacing operations, and were particularly unsatisfactory for replacements or repairs as by unskilled persons or children.

One object of this invention is to provide an improved self-sealing valve of the type described, in which is obviated the fore-mentioned difficulties, by the provision of effective and efficient means whereby substantially unskilled persons are enabled quickly and easily to repair the valve when its self-sealing properties become impaired.

Another object of the invention is to provide an improved valve of the character described, including a self-sealing core which may be readily and inexpensively replaced or enhanced with tools and materials which are usually readily available.

Still another object of the invention is to provide a valve for hollow inflatable articles in which the self-sealing feature of the valve is materially aided by internal pressure of the inflated article.

These and other objects of the invention will be manifest from the following brief description and the accompanying drawing.

Of the accompanying drawing:

Figure 1 is a fragmentary vertical cross-section through a valve embodying the invention incorporated in a hollow inflatable ball.

Figure 2 is a similar view, on a larger scale, illustrating the valve with replaceable parts thereof removed.

Figure 3 is an enlarged side elevation of a replaceable self-sealing plug for the improved valve.

Figure 4 is a side elevation of a removable and replaceable retaining cap for the valve.

Referring particularly to Figure 1 of the drawing, the numeral 10 designates generally an inflating valve incorporated in a hollow rubber ball 11, which may be a football having an inner blader 12 of rubber or other air impervious material, and an outer cover of rubber having an appropriate molded design thereon, or of fabric, or leather as desired.

The valve 10 may comprise a hollow stem portion 13 of vulcanized rubber extending integrally from a relatively thin base portion 14, which may be circular or ovate, or as desired, and tapered outwardly to feathered edges. The inner surface of the base 14 is cemented, cured, or otherwise adhered to the outer face of bladder 12, with stem 13 projecting inwardly through an aperture 15 therein. Stem 13 may have an inwardly curving wall, as indicated at 16, tapering to a relatively small rounded tip 17, and providing a similarly shaped chamber 18 in the valve. An opening 19 from the chamber 18 and through base 14 is of diameter substantially equal to that of the widest part of said tapered chamber, for a purpose to be described.

As best shown in Figure 3, a tapered plug 21 of soft vulcanized rubber, and of substantially the same shape as chamber 18, but slightly larger so as to be receivable therein against inherent resiliency or elasticity of the wall of stem 13. A reduced portion 22 of plug 21 provides a shoulder 23 to be yieldingly receivable under corresponding shoulder portions 24 in the chamber, said reduced portion 22 being adapted to extend outwardly a short distance through opening 19. Thus the plug is adapted to be forced into the chamber 18 and to be held therein by said resiliency of the expanded wall thereof and the interengaging shoulder portions 23 and 24 of plug 21 and stem 13, respectively. The plug may be cemented or otherwise adhered in chamber 18.

The plug 21 may be securely retained in stem 13 by means of a closure cap 25 (see Figure 4) of vulcanized rubber, preferably somewhat harder than the rubber of the valve, or other relatively hard material. This cap is adapted to be received in opening 19 of the stem and may have provided thereon an annular enlargement or tongue 26 adapted to be pressed into an annular groove 27a in stem 13 within the opening 19, by distorting the mouth portion of the stem, the inner face of said base portion being engageable with the outer end of plug 21. The reduced portion 27 of the cap then extends outwardly in opening 19, the outer end of the cap being made flush with the outer surface of the ball 11, as best illustrated in Figure 1. The cap also may be cemented in place if desired, and if the material thereof is substantially hard it may be necessary to provide a central aperture (not shown) for passage of the inflating needle.

In the use of the improved valve, assembled as described above and as shown in Figure 1, for inflating football 11, the needle of an inflating device of known type is pierced through the cap 25, soft-rubber plug or core 21, and tip end of tapered stem 13 to inflate the ball. Upon removal of the needle the compressive resiliency of the soft-rubber plug 21, both due to the inherent resiliency of wall 13 of the stem and the additional internal pressure against said wall, will be self-sealing to close the puncture made by said needle and thereby prevent escape of fluid-pressure medium from the ball.

In place of soft vulcanized rubber, the plug 21 may be of any self-sealing or self-healing material, such as raw or unvulcanized rubber, or the chamber 18 may be filled with rubber cement or like material adapted to have a similar self-healing effect. Likewise when it becomes necessary to replace or enhance the self-sealing properties of the plug 21 after continued use the cap 25 is readily removable, as by means of a pointed instrument (see chain-dotted lines in Figure 2) to permit such replacement, as by insertion of a new plug of the materials described above, or the chamber 18 may be filled with readily available material such as rubber cement commonly supplied in standard tire repair kits. The cap 25 is also readily replaceable when it becomes worn.

As the size of opening 19 closely approximates the size of the plug or core 21 at its generally greatest perimeter, quick and effective performance of the above operations is greatly facilitated, whether for the original installation in a ball or for replacement purposes.

Thus has been provided an improved self-sealing valve which attains the purposes set forth in the objects. Modifications of the invention may be resorted to without departing from the spirit thereof or the scope of the appended claims.

What is claimed is:

1. A valve for inflatable articles, comprising a stem of rubber or like material having a cavity therein and having an opening at one end to be presented outwardly of the article, a self-سealing plug received in said stem cavity, a closure cap for fitting in said opening for retaining said plug in the stem, and interconnecting tongue and groove means on said stem and said cap for releasably securing the cap in said opening.

2. A valve for inflatable articles, comprising a stem of rubber or like material having a cavity therein and having an opening at one end to be presented outwardly of the article, said opening relative to said cavity providing an inwardly presented shoulder on said stem, a plug of self-sealing material received in said stem cavity and engaging said shoulder, a closure cap for fitting in said outer opening for retaining said plug in the stem, and interconnecting means on said stem and said cap for releasably securing the cap in said opening, the size of said outer opening approximating the size of said plug at its greatest perimeter.

3. A valve for inflatable articles, comprising a stem of rubber or like material having a cavity therein and having an opening at one end to be presented outwardly of the article, said opening relative to said cavity providing an inwardly presented shoulder on said stem, the wall of said stem tapering from adjacent said open end to a rounded tip, a plug of self-sealing material received in said stem cavity and engaging said shoulder, a closure cap for fitting in said opening for retaining said plug in the stem cavity, and interconnecting means on said stem and said cap for releasably securing the cap in said opening against the resiliency of the rubber of said stem, the size of said opening approximating the size of said plug at its greatest perimeter.

4. A valve for inflatable articles, comprising a stem of rubber or like material having a cavity therein and having an opening at one end to be presented outwardly of the article, a plug of self-sealing material received in said stem cavity, a closure cap for fitting in said opening for retaining said plug in the stem cavity, and interconnecting means on said stem and said cap for releasably securing the cap in said opening, the size of said opening approximating the size of said plug at its greatest perimeter, said interconnecting means comprising an annular recess in said opening of the stem and an annular enlargement provided on said cap adapted to be received in said annular recess.

5. A valve for inflatable articles, comprising a stem of rubber or like material having a cavity therein and having an opening at one end to be presented outwardly of the article, the wall of said stem tapering from adjacent said open end to a rounded tip, a plug of self-sealing material received in said stem cavity, a closure cap for fitting in said opening for retaining said plug in the stem cavity, and interconnecting means on said stem and said cap for releasably securing the cap in said opening, the size of said opening approximating the size of said plug at its greatest perimeter, said interconnecting means comprising an annular recess in said opening of the stem and an annular enlargement provided on said cap adapted to be received in said annular recess.

FRANK FENTON.